(12) United States Patent  
Jacobs et al.

(10) Patent No.: US 6,516,640 B2
(45) Date of Patent: Feb. 11, 2003

(54) STEERING COLUMN LOCK APPARATUS AND METHOD

(75) Inventors: Ronald S. Jacobs, Clifton Park, NY (US); John Bailen, Greendale, WI (US); Melissa Fleming, Oostburg, WI (US)

(73) Assignee: Strattec Security Corporation, Milwaukee, WI (US)

( * ) Notice: Subject to any disclaimer, the term of this patent is extended or adjusted under 35 U.S.C. 154(b) by 0 days.

(21) Appl. No.: 09/730,099

(22) Filed: Dec. 5, 2000

(65) Prior Publication Data

US 2002/0066295 A1 Jun. 6, 2002

(51) Int. Cl.[7] ............................................. B60R 25/02
(52) U.S. Cl. ................................... 70/186; 70/252
(58) Field of Search ........................ 70/182–186, 252

(56) References Cited

U.S. PATENT DOCUMENTS

| | | | | |
|---|---|---|---|---|
| 1,347,564 A | * | 7/1920 | Turner | 70/183 |
| 1,668,147 A | * | 5/1928 | Hershey | 70/252 |
| 3,241,344 A | | 3/1966 | Peters | |
| 3,680,335 A | * | 8/1972 | Onishi | 70/252 |
| 3,709,006 A | | 1/1973 | Seidewand | 70/377 X |
| 3,779,332 A | | 12/1973 | Snitgen | 70/255 X |
| 4,137,985 A | | 2/1979 | Winchell | 180/114 |
| 4,248,070 A | | 2/1981 | Eichenauer | 70/252 |
| 4,332,306 A | | 6/1982 | Turatti | 180/287 |
| 4,414,830 A | * | 11/1983 | Maiocco | 70/186 X |
| 4,426,864 A | | 1/1984 | Morikawa | 70/431 |
| 4,428,024 A | | 1/1984 | Mochida et al. | 361/172 |
| 4,466,262 A | * | 8/1984 | Maiocco et al. | 70/186 X |
| 4,487,042 A | * | 12/1984 | Mochida et al. | 70/186 X |
| 4,583,148 A | | 4/1986 | Lipschütz | 361/172 |
| 4,603,564 A | | 8/1986 | Kleinhäny et al. | 70/277 |
| 4,685,313 A | * | 8/1987 | Neyret | 70/186 |
| 4,716,748 A | | 1/1988 | Watanuki et al. | 70/252 |
| 4,761,645 A | | 8/1988 | Mochida | 361/172 X |
| 4,773,241 A | * | 9/1988 | Peitsmeier et al. | 70/185 X |
| 4,827,744 A | | 5/1989 | Namazue et al. | 70/252 |
| 4,848,115 A | | 7/1989 | Clarkson et al. | 70/276 |
| 4,898,010 A | | 2/1990 | Futami et al. | 70/257 X |
| 4,939,915 A | | 7/1990 | Vonlanthen | 70/277 |
| 5,036,687 A | | 8/1991 | Takeuchi et al. | 70/186 |
| 5,255,547 A | | 10/1993 | Burr et al. | 70/252 |
| 5,271,252 A | * | 12/1993 | Yasuhara et al. | 70/186 |
| 5,343,077 A | | 8/1994 | Yoshia et al. | 70/252 X |
| 5,398,532 A | | 3/1995 | Janssen et al. | 70/252 |
| 5,454,238 A | | 10/1995 | Ross et al. | 70/186 |
| 5,495,732 A | * | 3/1996 | Nagae et al. | 70/252 |
| 5,654,689 A | | 8/1997 | Peyre et al. | 340/426 |

(List continued on next page.)

FOREIGN PATENT DOCUMENTS

| | | | | | |
|---|---|---|---|---|---|
| DE | 2035282 | * | 1/1972 | | 70/186 |
| DE | 3344411 | * | 6/1985 | | 70/252 |
| DE | 3739172 | * | 2/1989 | | 70/182 |
| DE | 4434655 C2 | | 8/1999 | | |
| IT | 315310 | * | 2/1934 | | 70/186 |
| JP | 24243 | * | 1/1990 | | 70/182 |

*Primary Examiner*—Lloyd A. Gall
(74) *Attorney, Agent, or Firm*—Michael Best & Friedrich LLP

(57) ABSTRACT

The present invention provides a manner in which a lock bolt can be engaged and secured in locked and unlocked positions with respect to a steering column. In some preferred embodiments, a pawl is movable into and out of engagement with the lock bolt in two different locations on the lock bolt corresponding to two different positions of the lock bolt relative to the steering column: a position in which the lock bolt is extended to lock the steering column and a position in which the lock bolt is retracted to unlock the steering column. The pawl can be movable into and out of engagement with the lock bolt in a number of different manners, but preferably is pivotable about a pivot pin. Preferably, the pawl is connected to an actuator for actuating the pawl into and out of engagement with the lock bolt.

23 Claims, 5 Drawing Sheets

U.S. PATENT DOCUMENTS

| | | | |
|---|---|---|---|
| 5,656,867 A | 8/1997 | Kokubu | 307/10.5 |
| 5,656,868 A | 8/1997 | Gottlieb et al. | 307/10.6 |
| 5,718,132 A * | 2/1998 | Riefe et al. | 70/186 |
| 5,808,372 A | 9/1998 | Schwegler et al. | 307/10.3 |
| 5,808,543 A | 9/1998 | Peyre | 340/426 |
| 5,811,887 A | 9/1998 | Peyre et al. | 307/10.3 |
| 5,893,429 A | 4/1999 | Hackl et al. | 70/253 X |
| 5,896,765 A | 4/1999 | Peyre et al. | 70/186 |
| 5,982,295 A | 11/1999 | Goto et al. | 70/252 X |
| 5,990,574 A | 11/1999 | Lecznar et al. | 307/10.5 |
| 5,992,263 A | 11/1999 | Bleuel et al. | 74/493 |
| 6,006,561 A | 12/1999 | Hill et al. | 70/276 |
| 6,011,321 A | 1/2000 | Stancu et al. | 307/10.5 |
| 6,127,922 A | 1/2000 | Roddy et al. | 430/426 |
| 6,040,638 A | 3/2000 | Howell | 307/10.2 |
| 6,053,067 A | 4/2000 | Garnault et al. | 74/492 |
| 6,067,007 A | 5/2000 | Gioia | 340/426 |
| 6,067,824 A | 5/2000 | Osborne | 70/252 |
| 6,078,293 A | 6/2000 | Yamamoto | 343/713 |
| 6,107,914 A | 8/2000 | Greene | 340/426 |
| 6,125,671 A * | 10/2000 | Suzuki | 70/186 |
| 6,295,848 B1 * | 10/2001 | Suzuki | 70/186 |

* cited by examiner

STEERING COLUMN LOCK APPARATUS AND METHOD

FIELD OF THE INVENTION

The present invention relates to locks and locking methods, and more particularly to devices and methods for locking and unlocking vehicle steering columns.

BACKGROUND OF THE INVENTION

Numerous devices and methods exist for locking a vehicle steering column from movement. Most commonly, such devices and methods prevent the steering column from being rotated to steer the vehicle. The vehicle can be a car, van, truck, motorcycle, bus, or all-terrain vehicle having a number of wheels, a boat with one or more rudders, a snowmobile with skis, a vehicle having one or more tracks, and the like. A steering column lock used in any such vehicle is typically employed to prevent vehicle theft or unauthorized use.

A popular and well-known mechanism for locking a steering column is a lock bolt that is spring-loaded into releasable engagement with a groove or aperture in the steering column. A mechanism is normally provided for retracting the lock bolt against the spring-loaded force to unlock the steering column for vehicle operation. As is well known to those skilled in the art, the mechanism can retract the lock bolt in response to user insertion and turning of a key.

Common design concerns with steering column locks include the ability of a thief or other unauthorized user to release the lock bolt from the steering column (thereby unlocking the steering column), and the ability of the lock bolt to engage and lock the steering column during vehicle operation. Conventional steering column latches fail to address both of these concerns well. By way of example only, a number of steering column lock designs rely only upon a spring to hold the lock bolt in or out of engagement with the steering column. As another example, some steering column locks are more susceptible to tampering, physical manipulation, or force to be moved to their unlocked positions. Also, many conventional steering column locks fail to employ any element or elements positively engaging with the lock bolt to protect against unintentional lock bolt engagement with the steering column (such as during device operation under significant vibration).

Another design concern with steering column locks is device complexity. Increased device complexity leads to increased lock cost and potential for lock operational problems and even malfunction. Accordingly, the relatively complex structures of conventional steering column locks often represent less than optimal lock designs.

In light of the problems and limitations of the prior art described above, a need exists for a steering column lock that is relatively simple, reliably locks and unlocks the steering column, has a lock bolt that is engaged and held in both its locked and unlocked positions, is less susceptible to being unlocked by an unauthorized user, and is protected against unintentional locking even in stressful operating environments. Each preferred embodiment of the present invention achieves one or more of these results.

SUMMARY OF THE INVENTION

The present invention provides a manner in which a lock bolt can be engaged and secured in locked and unlocked positions with respect to a steering column. In some preferred embodiments of the present invention, a pawl is movable into and out of engagement with the lock bolt in two different locations on the lock bolt corresponding to two different positions of the lock bolt relative to the steering column: a position in which the lock bolt is extended to lock the steering column and a position in which the lock bolt is retracted to unlock the steering column. The pawl can be movable into and out of engagement with the lock bolt in a number of different manners, but preferably is pivotable about a pivot pin. Preferably, the pawl is connected to an actuator for actuating the pawl into and out of engagement with the lock bolt. The pawl can be manually operated in other embodiments of the present invention.

To establish engagement of the pawl with the lock bolt in some preferred embodiments of the present invention, an engagement portion of the pawl is moved into one of at least two recesses in the lock bolt. In this manner, the engagement portion of the pawl at least prevents retraction of the lock bolt when the lock bolt is in its locked position and extension of the lock bolt when the lock bolt is in its unlocked position. In alternative embodiments, the engagement portion of the pawl can engage with and limit movement of the lock bolt in other manners (such as by being retained between protrusions on the lock bolt).

The lock bolt can have multiple parts or can be a single integral unit. In a preferred embodiment, the lock bolt has a shaft piece for engaging with a steering column and a shuttle piece movable with respect to the shaft piece and with which the pawl engages. Such a multiple-piece lock bolt permits the lock bolt to be moved and retained in a locked position even though the shaft piece is not yet able to engage with the steering column. The lock bolt is preferably normally biased toward engagement with the steering column, and the pawl is preferably normally biased toward engagement with the lock bolt by biasing elements (such as springs, for example).

The steering column lock of the present invention can be used in conjunction with an electronic user identification system such as a conventional passive entry system. An electronic user identification system can be connected to the pawl actuator if desired, and can even be connected to another actuator for extending and retracting the lock bolt in some preferred embodiments. To unlock the steering column lock, the pawl is first retracted from engagement therewith. Preferably, the pawl is retracted only after identification of an authorized user, which can be by an electronic identification process generating a signal to actuate the pawl actuator and to disengage the pawl, the insertion and turning of an authorized key into a conventional lock tumbler mechanically connected to the pawl, and the like. After the pawl has been retracted, the lock bolt can preferably be retracted by a mechanical connection between a rotatable ignition switch and the lock bolt. The lock bolt can instead be retracted in other manners, such as by an electrical connection between an ignition switch and an actuator connected to the lock bolt or by manual retraction by a user. During or after lock bolt retraction, the pawl is preferably extended toward the lock bolt for engagement therewith at a different location on the lock bolt. Such extension can be by the pawl actuator, by manual user manipulation, by a mechanical linkage between the ignition switch and the pawl, and the like. Once engaged by the pawl in the unlocked position, the lock bolt is protected from unintentionally engaging with the steering column even under high vibration and harsh operating conditions.

The steering column lock is preferably locked in a process that is generally the reverse of that just described. The pawl is first retracted by the pawl actuator or in another manner desired, after which time the lock bolt is extended into engagement with the steering column and the pawl is extended again by the pawl actuator (or in another manner) into engagement with the lock bolt at a different location on the lock bolt. By being engaged with the pawl in the locked position, the steering column lock of the present invention is made significantly more difficult to compromise and cannot be forced into an unlocked position without retraction of the pawl (preferably by electronically triggering actuation of the pawl actuator).

The present invention therefore provides an apparatus and method for locking a steering column that is simple, is capable of resisting even forceful attempts to unlock the steering column without authorization, and protects against unintentional locking of the steering column even under stressful operating conditions. More information and a better understanding of the present invention can be achieved by reference to the following drawings and detailed description.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF THE PREFERRED EMBODIMENTS

Figure 1:
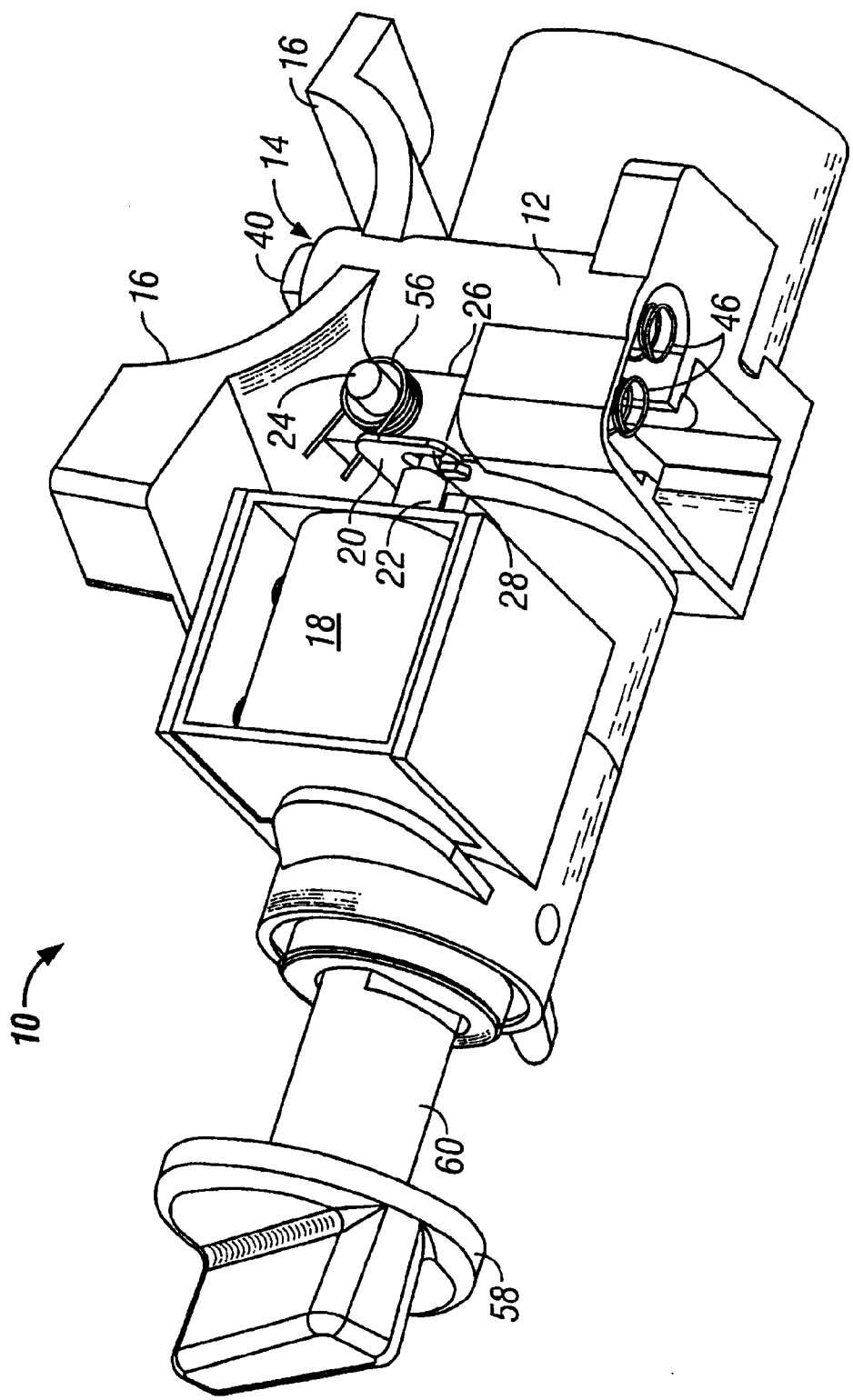
FIG. 1 is a perspective view of a steering column lock assembly according to a preferred embodiment of the present invention.

With reference first to FIG. 1 which shows one highly preferred embodiment of the present invention, the lock apparatus 10 preferably has a housing 12 within which is received a lock bolt 14 that can be extended and retracted to lock and unlock a steering column (not shown), respectively. When extended, the lock bolt 14 preferably enters into a groove, slot, recess, or other aperture in a steering column in a manner well known to those skilled in the art, thereby preventing the steering column from being rotated by a user. The lock apparatus 10 is therefore preferably mounted adjacent to the steering column in any conventional manner, such as by being mounted to framework of the vehicle with welds, threaded fasteners, rivets, and the like. The various manners in which steering column locks are secured within a vehicle are well known to those skilled in the art and are not therefore described further herein. Any such manner can be employed in conjunction with the present invention.

Although not required, the lock apparatus 10 can be adapted to fit around at least a portion of a steering column. For example, the housing 12 can have one or more walls 16 shaped to cup or otherwise fit around a steering column. The walls 16 can partially or fully support the steering column, can guide the steering column in its rotation by a user, and/or can at least partially enclose the lock bolt 14 and the mating steering column recess. In some highly preferred embodiments such as that shown in the figures, the walls 16 perform all of these functions. In the illustrated preferred embodiment for example, the walls 16 are arc-shaped to extend around a steering column, but can otherwise take any other shape desired.

With reference next to FIGS. 2–5, the lock assembly 10 preferably further includes an actuator 18 and a pawl 20 for releasable engagement with the lock bolt 14. The actuator 18 is preferably secured within the housing 12 by one or more threaded fasteners 44, but can instead be secured within the housing 12 in any other conventional manner. In other embodiments, part or all of the actuator 18 is located outside of the housing 12 and is secured with respect to the lock bolt 14 by attachment to the housing 12 or to a frame of the apparatus 10 used in place of the housing 12. The actuator 18 is preferably an electromagnetic solenoid operable in a conventional manner to extend and retract an armature 22 therein in a manner well known to those skilled in the art.

The armature 22 of the actuator 18 is directly or indirectly connected to the pawl 20 for actuation thereof. The pawl 20 is preferably pivotable with respect to the lock bolt 14, and can be mounted upon a pivot pin or post 24 extending from any stationary structure of the lock apparatus 10. In highly preferred embodiments such as that shown in the figures, the pivot pin 24 is attached to or is integral with the housing 12. Any portion or all of the pawl 20 can be located within the housing 12. However, the pawl 20 is preferably mounted to the exterior of the housing 12 and is pivotable by the actuator 18 into and out of engagement with the lock bolt 14 through an aperture 26 in the housing 12 (see FIG. 1).

The pawl 20 is preferably connected to the armature 22 by a hole, notch, or other aperture 28 through which a part of the armature 22 extends. Sufficient clearance between the armature 22 and the aperture 28 exists to enable the armature 22 to extend and retract while permitting the pawl 20 to pivot about the pivot pin 24. One having ordinary skill in the art will appreciate that many other manners exist for connecting the pawl 20 to the armature 22 in a manner permitting the pawl 20 to pivot upon actuation of the armature 22 (such as a ball joint connection, one or more cam surfaces on the pawl 20 against which the end of the armature 22 rides to pivot the pawl 20, and the like).

As described above, the lock bolt 14 is movable into and out of engagement with the steering column to lock and unlock the steering column, respectively. The lock bolt 14 is therefore preferably movable within walls 30 of the housing 12 which retain and guide the lock bolt 14 in its extended and retracted positions and in its movement therebetween. In alternative embodiments, the walls 30 can be replaced by a plurality of bosses, fingers, pads, or other structures extending from the housing 12. Such elements can instead extend from a frame of the apparatus when used in place of or in addition to a housing 12.

The lock bolt 14 can take any shape desired, and in some preferred embodiments has a generally elongated shape with an enlarged base 32. The lock bolt 14 can be one element or a number of elements connected together in any conventional manner. For example, the lock bolt 14 can be an integral shaft made of one or several pieces (not shown) or can have multiple elements movable with respect to one another such as the lock bolt 14 shown in the figures. In the illustrated preferred embodiment, the lock bolt 14 includes a shaft piece 34 and a shuttle 36 movable with respect to the shaft piece 34. The shaft piece 34 and shuttle 36 are preferably retained within and guided by walls 30 of the housing 12 as described above. The shaft piece 34 is most preferably received through an aperture 38 in the shuttle 36, which helps to align the shaft piece 34 within the walls 30. In alternative embodiments, the shuttle 36 is received within an aperture in the shaft piece 34 permitting relative movement between these elements in a manner similar to the illustrated shaft piece 34 and shuttle 36. The head 40 of the shaft piece 34 can be enlarged as shown in the figures or can be the same size or smaller than the rest of the shaft piece 34.

As mentioned above, some preferred embodiments of the present invention employ a elongated bolt 14 with an enlarged base 32. In the illustrated preferred embodiment, the enlarged base 32 is on the shuttle 36, although the enlarged base 32 can instead be on the shaft piece 34 if desired. This enlarged base 32 preferably retains the lock bolt 14 in the housing 12 or frame of the apparatus 10 and limits outward movement of the lock bolt 14. Specifically, the housing 12 or frame of the apparatus 10 preferably has a wall 42, beam, or other member against which the enlarged base 32 stops when the lock bolt 14 is pushed out to engage the steering column. Preferably, an area exists behind the lock bolt 14 for positioning a biasing element to act against the lock bolt 14 as will now be described.

The lock bolt 14 is preferably biased toward the steering column by one or more springs 46. In the embodiment shown in FIGS. 1–5, two compression springs 46 are located adjacent to the enlarged end 32 of the lock bolt 14 and bias the lock bolt 14 in this manner. At least one of the compression springs 46 preferably biases the shaft piece 34 of the lock bolt 14 toward the steering column. It should be noted that other conventional biasing elements can instead be employed to bias the lock bolt 14. By way of example only, the lock bolt 14 can be biased by one or more extension, leaf, coil, or other types of springs, by a pair of opposed magnets mounted on the shuttle 36 and on the housing 12 behind the shuttle 36, by any type of conventional actuation device such as an electromagnetic solenoid or a hydraulic or pneumatic actuator, and the like.

One having ordinary skill in the art will appreciate that the lock bolt 14 can be retained within the apparatus 10 in any number of different manners (rather than or in addition to using an enlarged base 32 of the lock bolt 14). For example, the walls 30 can have one or more inwardly-extending ribs, posts, fingers, or other projections against which a surface of the lock bolt 14 stops in its farthest extended position, the lock bolt 14 can have a pin extending therefrom into a groove in a wall 30 (having an end against which the pin stops to thereby stop further movement of the lock bolt 14), the ends of the walls 30 adjacent to the steering column can be inwardly flanged to permit only the tip of the lock bolt 14 to extend out of the housing 12 or frame, etc. Each of these alternative structures and each of the different lock bolt shapes that can be used in conjunction with these structures falls within the spirit and scope of the present invention.

The use of a two-piece lock bolt 14 as described above and illustrated in the figures provides some advantages over a one-piece lock bolt, although either type of lock bolt can be used with the present invention. Where such a two-piece lock bolt 14 is employed, movement of the lock bolt 14 can be independent of movement of the lock bolt head 40. This is desirable when at least one part of the lock bolt 14 is preferably movable to a locked position regardless of whether the lock bolt 14 is aligned with a mating steering column aperture. In other embodiments (such as where a one-piece lock bolt is used) the entire lock bolt 14 can remain outside of its locked position until such alignment occurs.

Where a two-piece lock bolt 14 is used such as that described above and illustrated in the figures, both pieces are preferably biased toward the steering column. With reference to FIGS. 2–5, the shuttle 36 is preferably connected to and biased by one spring 46 while the shaft piece 34 is preferably connected to and biased by another spring 46. Therefore, the shuttle 36 can be moved to its locked position by one spring 46 independent of whether the lock bolt head 40 and shaft piece 34 are movable to their locked positions by the other spring 46. One having ordinary skill in the art will appreciate that any number of springs and spring types can be used to individually bias the shaft piece 34 and shuttle 36 of the lock bolt 14, and that even one spring connected to both the shaft piece 34 and shuttle 36 can be used to perform the same functions as described above. For example, rather than have a spring 46 located behind the shaft piece 34 to bias the shaft piece 34 toward the steering column, a spring can be located between the lock bolt head 40 and the shuttle 36 for biasing the head 40 and shaft piece 34 in a similar manner. In this regard, it should be noted that the shaft piece 34 need not mate with the shuttle 36, but can be separated from the shuttle 36 by a spring. Other manners exist for connecting bias elements to the lock bolt 14 and its constituent elements, each of which falls within the spirit and scope of the present invention.

The lock bolt 14 preferably has at least two apertures 48 within which the pawl 20 can be received. The apertures 48 can take any form and shape, including without limitation notches, sockets, recesses, depressions, and the like, and are preferably aligned longitudinally along the lock bolt 14. Although the apertures 48 can run around the lock bolt 14 (e.g., annular apertures), they are more preferably located on a side of the lock bolt 14 facing the pawl 20. The apertures 48 can extend through the lock bolt 14, but more preferably do not. The apertures 48 are preferably shaped to match an engagement portion 50 of the pawl 20, which is movable toward and away from the lock bolt 14 as described in more detail above. For example, the pawl 20 can have an engagement portion 50 that is rotated (when the pawl 20 is rotated) into a lock bolt aperture 48 aligned therewith. The aperture 48 can be apexed to match an apexed pawl engagement portion 50, can have a concave curve to mate with a convexly-curved pawl engagement portion 50, can be square, rectangular, or polygonal to match a similar pawl engagement portion shape, and the like. In other embodiments, the apertures 48 do not match any portion of the pawl 20, and only provide an area within which the pawl 20 can be received in the lock bolt 14.

In some highly preferred embodiments of the present invention, at least one of the lock bolt apertures 48 has a hook-shaped portion 52 for releasable engagement with a hook shaped portion 54 of the pawl 20. Although hook shaped portions on either or both the lock bolt aperture 48 and pawl 20 are not required, such portions provide improved engagement between the pawl 20 and lock bolt 14. In addition, hook shaped portions 52 on either or both lock bolt apertures 48 are possible.

Where lock bolts having multiple portions are used, the lock bolt apertures 48 can be located on any portion of the lock bolt 14. Most preferably however, the lock bolt apertures 48 are located on the shuttle 36 of the lock bolt 14 described above and illustrated in the figures.

Regardless of the shapes of the lock bolt apertures 48 and the engagement portion 50 of the pawl 20, the pawl 20 is movable toward and away from the lock bolt 14 in at least two positions of the lock bolt 14. When moved into engagement with the lock bolt 14, the pawl 20 prevents movement of at least part of the lock bolt 14. For example, when the lock bolt 14 is in its locked position, the pawl 20 engaged therewith prevents retraction of the lock bolt 14 to its unlocked position. Similarly, when the lock bolt 14 is in its retracted unlocked position, the pawl 20 engaged therewith prevents extension of the lock bolt 14 to its locked position. As another example, when the two-piece lock bolt 14 of the illustrated preferred embodiment is in its locked position, the pawl 20 engaged therewith prevents retraction of the shuttle 36 to an unlocked position even though the head 40 and shaft piece 34 can be moved to or remain in a retracted position.

Preferably, the shapes of the lock bolt apertures 48 and pawl engagement portion 50 at least prevent some portion of the lock bolt 14 from moving to an unlocked (e.g., retracted) position when engaged with the pawl 20 in a locked (e.g., extended) position, and prevent at least some portion of the lock bolt 14 from moving to a locked (e.g., extended) position when engaged with the pawl 20 in an unlocked (e.g., retracted) position. The pawl 20 can still permit other types of lock bolt movement when the lock bolt 14 is engaged with the pawl 20. By way of example only, the pawl 20 need not necessarily block further extension of the lock bolt 14 when in its locked position, and need not necessarily block further retraction of the lock bolt 14 when in its unlocked position.

As described above, the pawl 20 is movable into and out of engagement with the lock bolt 14, and therefore has one or more surfaces that interfere with one or more surfaces of the lock bolt 14 to prevent lock bolt movement when engaged with the pawl 20. One having ordinary skill in the art will appreciate that this interfering relationship between the pawl 20 and the lock bolt 14 does not require the pawl engagement portion 50 and lock bolt apertures 48 described above. Instead, the lock bolt 14 can have or more external walls serving the same function as the walls defining the lock bolt apertures 48 described above. The lock bolt 14 (or portion thereof) can have one or more ribs, steps, protrusions, ridges, or other elements providing the surface(s) against which the pawl 20 engages to prevent lock bolt movement. By way of example only, the two lock bolt apertures 48 in the illustrated preferred embodiment can be replaced by three protrusions extending from the exterior surface of the shuttle 36. The engagement portion 50 of the pawl 20 can be received between a first and second protrusion to engage the shuttle 36 in a locked position and between the second and a third protrusion to engage the shuttle 36 in an unlocked position. Other lock bolt and pawl features and shapes enabling this releasable engagement are possible and fall within the spirit and scope of the present invention.

Although the pawl 20 and lock bolt 14 can preferably be engaged in two positions of the lock bolt 14, it should be noted that any number of engagement positions on the lock bolt 14 are possible, limited only by the shape of the lock bolt 14 (e.g., by the number of apertures or protrusions on the lock bolt 14).

In some highly preferred embodiments of the present invention, the pawl 20 is biased toward the lock bolt 14 for engagement therewith. Any type of conventional biasing element can be employed for this purpose, such as one or more pairs of opposed magnets on the pawl 20 and surrounding assembly structure, one or more conventional springs connected to the pawl 20, and the like. Preferably, a conventional torsion spring 56 mounted upon the pawl pivot pin 24 is employed. Other types of springs such as extension, compression, and leaf springs can instead be used as desired.

Other preferred embodiments of the present invention employ a pawl 20 that shifts or translates rather than pivots. In such embodiments, the pawl 20 can be shifted or translated along a guide, rail, track, or similar structure mounted in the housing 12 or frame of the apparatus 10, and still preferably engages with the lock bolt 14 by being removably inserted into one of two or more lock bolt apertures 48 or in two or more positions between external surfaces of the lock bolt 14 as described above. In this regard, other embodiments dispense with the pawl 20 altogether, in which case the armature 22 of the actuator 18 is removably engagable with the lock bolt 14 in two or more positions of the lock bolt 14 as described above.

Figure 2:
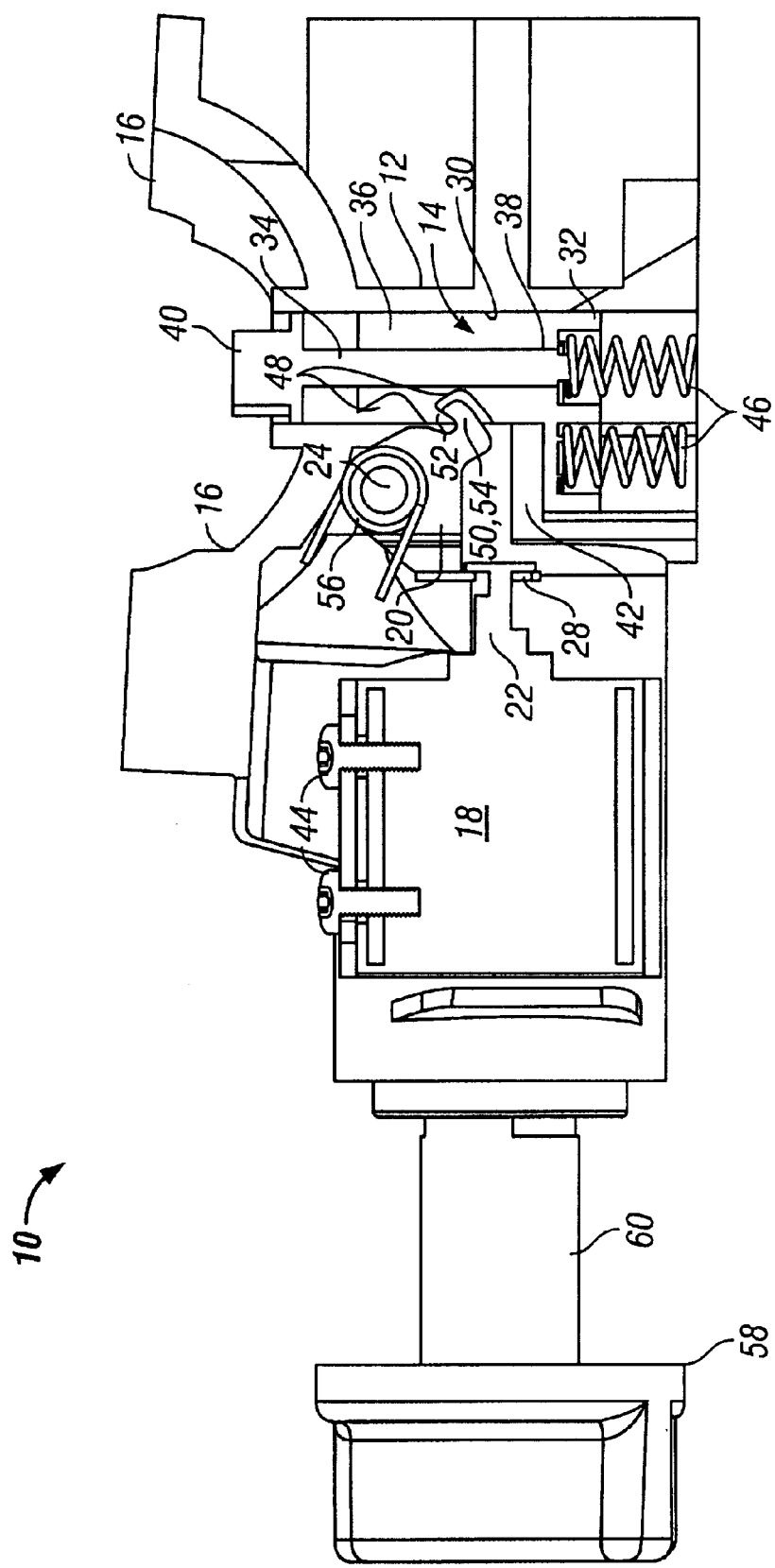
FIG. 2 is a cross-sectional view of the steering column lock illustrated in FIG. 1 and showing the steering column lock in a locked and engaged state.
Figure 3:
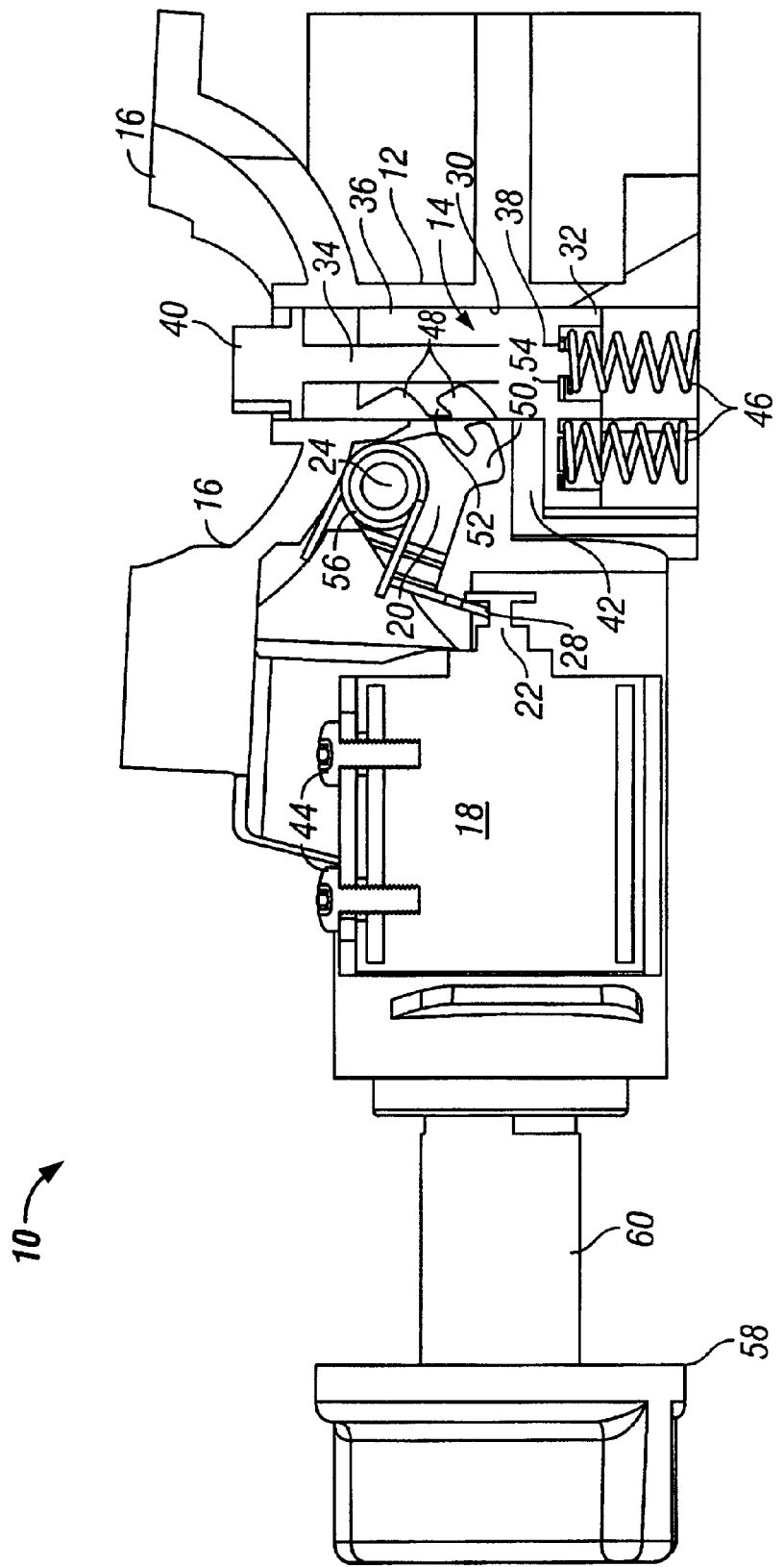
FIG. 3 is a cross-sectional view of the steering column lock as illustrated in FIG. 2, showing the steering column lock in a locked and disengaged state.

In operation, a user wishing to unlock the steering column preferably causes an authorization signal to be transmitted to the actuator 18 to disengage the pawl 20 from the lock bolt 14. In one highly preferred embodiment illustrated in the figures, this is performed by the user axially pressing the ignition switch 58, which transmits a signal to a controller (not shown). The controller then initiates a user recognition process in which wireless signals are transmitted to and from a fob, card, or other device on or near the user in a conventional manner. After thus confirming that the user is an authorized user, the controller sends a signal to the actuator 18 to move the armature 22 and to disengage the pawl 20 from a first lock bolt aperture 48 in the lock bolt 14 (compare FIGS. 2 and 3, showing the pawl 20 engaged with the lock bolt 14 and disengaged from the lock bolt 14, respectively). The lock bolt 14 is now free to be retracted by the user if desired.

Where employed in conjunction with the present invention, a "controller" includes without limitation any electronic device or circuitry, whether microprocessor-based, employing discreet components, or otherwise, capable of operating the actuator 18 and any other actuation device used for moving the pawl 20 and/or for moving the lock bolt 14 of the present invention.

Other manners exist in which to retract the pawl 20 following confirmation that a user is an authorized user. By way of example only, the actuator 18 can be connected to a conventional key-operated ignition lock in a conventional manner either directly or by a controller. When the actuator 18 receives a signal from the controller or ignition lock that a proper key is in the ignition lock, the actuator 18 can respond by actuating the pawl 20 out of engagement with the lock bolt 14. As another example, the pawl 20 can be mechanically connected to a key cylinder and can be retracted by rotation of the key cylinder when a proper key is inserted and turned therein. As yet another example, the actuator 18 can be triggered by a user depressing a button located anywhere in the vehicle (following user authorization in any conventional manner as described above). The pawl 20 can also or instead be manually disengaged from the lock bolt 14 by a user-accessible and manipulatable control such as a handle, knob, lever, or other device connected to the pawl 20.

After the pawl 20 has been retracted, the lock bolt 14 can be disengaged from the steering column in any manner desired. A number of conventional manners exist for performing this function, each of which falls within the spirit and scope of the present invention. In the illustrated preferred embodiment for example, a cam (not shown) directly or indirectly connected to shaft 60 of the ignition switch 58 rotates with the ignition switch 58 and presses against the base 32 of the lock bolt 14 to retract the lock bolt 14 from the steering column. As another example, an electromagnetic solenoid or other conventional actuator connected to the lock bolt 14 can be actuated to retract the lock bolt 14 from the steering column. This actuator can be connected to a controller and/or to the ignition switch and can respond thereto by retracting the lock bolt 14. As yet another example, the lock bolt 14 can even be manually pulled from the steering column by a knob, handle, or other user-manipulatable element attached to the lock bolt 14. The lock bolt 14 need not be physically connected to the ignition switch 58 for actuation thereby (in some embodiments for example, an ignition switch such as that illustrated in the figures is not even used). However, a physical connection between an ignition switch 58 and the lock bolt 14 is preferred for generating retraction of the lock bolt 14 responsive to user manipulation of the ignition switch 58.

Figure 4:
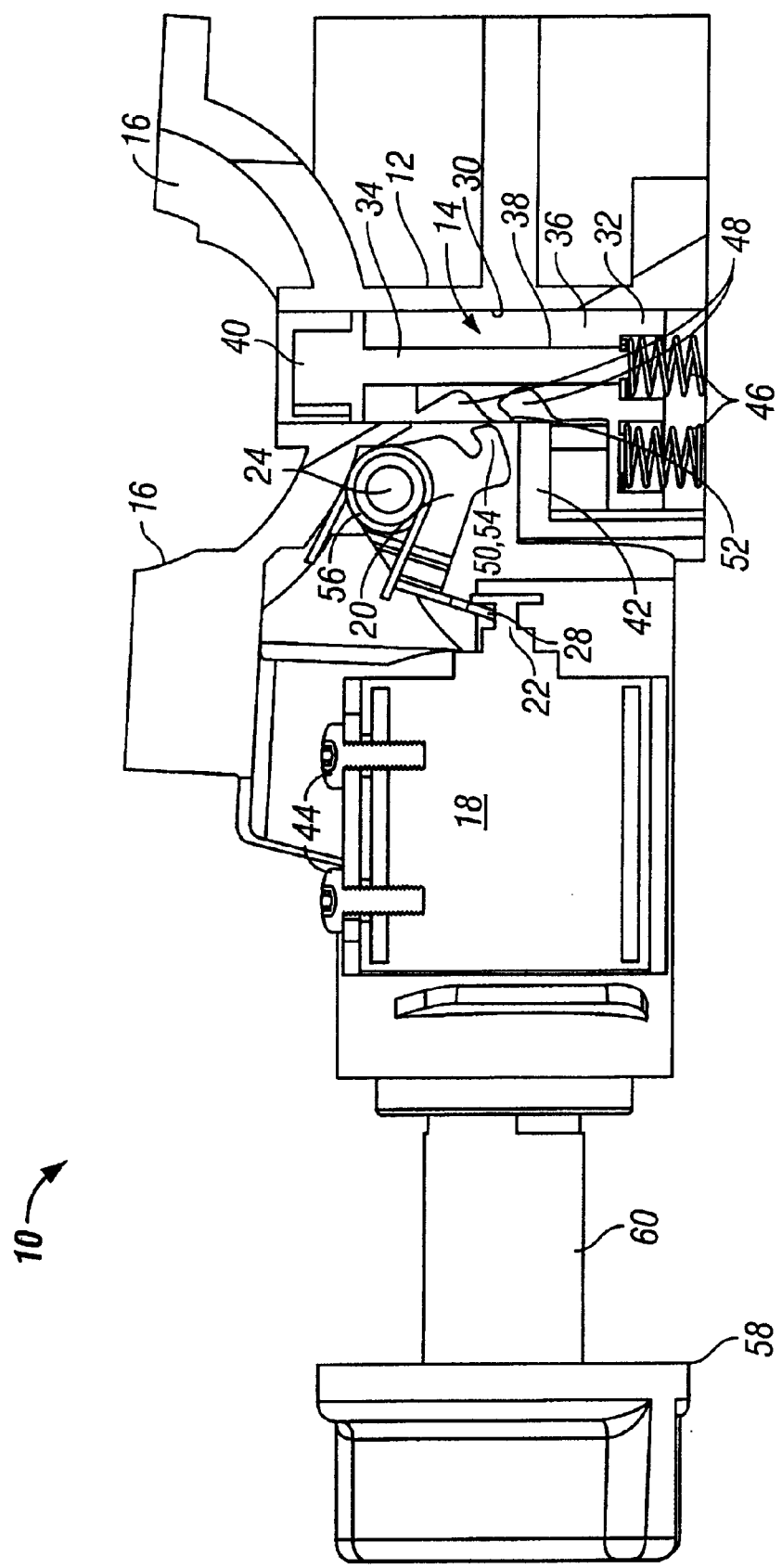
FIG. 4 is a cross-sectional view of the steering column lock as illustrated in FIG. 2, showing the steering column lock in an unlocked and disengaged state.
Figure 5:
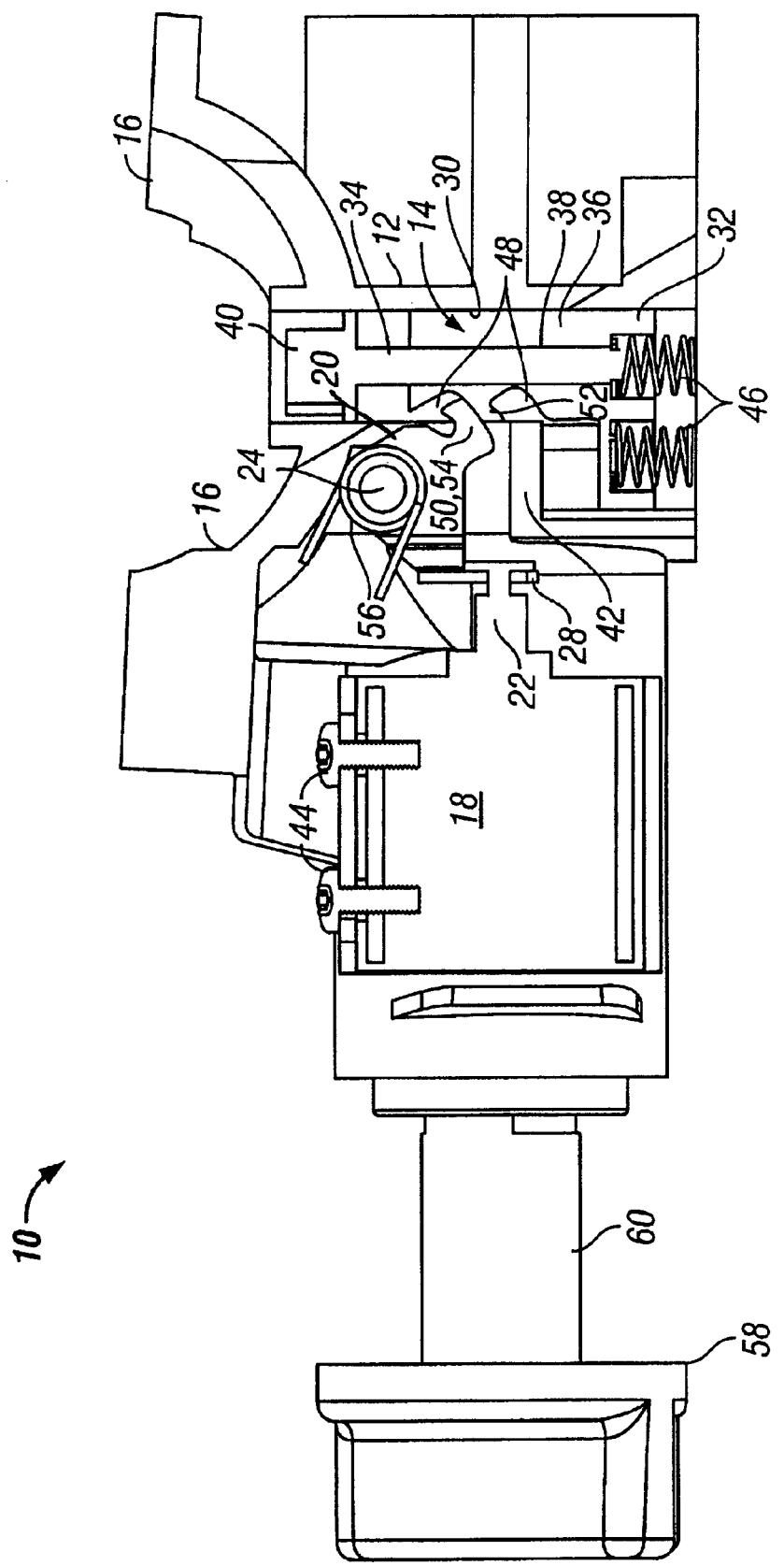
FIG. 5 is a cross-sectional view of the steering column lock as illustrated in FIG. 2, showing the steering column lock in an unlocked and engaged state.

To unlock the steering column, the lock bolt 14 is retracted to the unlocked position shown in FIG. 4. The pawl 20 preferably remains retracted by the actuator 18 while the lock bolt 14 is being moved to this unlocked position. In those embodiments employing a pawl spring 56 or other pawl biasing device, the pawl 20 is kept retracted under biasing force from the pawl spring 56. In other embodiments, the actuator 18 keeps the pawl 20 retracted at least as long as needed to permit the lock bolt 14 to move and to avoid re-engagement of the pawl 20 in the same lock bolt aperture 48. The pawl 20 can then ride upon the lock bolt 14 until the pawl 20 engages with the second lock bolt aperture 48 in the unlocked position of the lock bolt 14.

In some highly preferred embodiments such as that shown in the figures, the pawl 20 is retained in its retracted and disengaged position by the actuator 18 until a signal is sent to the actuator 18 to extend the pawl 20 into engagement with the lock bolt 14. This signal can be generated in any number of different manners, but preferably is sent by a controller (not shown) in response to a signal received from turning the ignition switch 58 to a predetermined position. Systems for electrically controlling components of a vehicle in response to user manipulation of an ignition switch are well known to those skilled in the art and therefore are not described in detail herein. One or more sensors directly or indirectly connected to the ignition switch 58 and to the controller can be used to detect when the ignition switch 58 has been sufficiently turned and to send a pawl re-engagement signal to the controller upon such an event. The controller preferably responds by triggering actuation of the actuator 18 to move the pawl 20 into engagement with the lock bolt 14.

In other embodiments of the present invention, the actuator 18 can be triggered to move the pawl 20 back into engagement with the lock bolt 14 in other manners. For example, one or more conventional position sensors or switches mounted in the housing 12 or apparatus frame can be located to detect when the lock bolt 14 has reached an unlocked (retracted) position and to send a pawl re-engagement signal to the actuator 18 and/or to the controller to trigger re-engagement of the pawl 20 with the lock bolt 14. As another example, the pawl 20 can be manually re-engaged with the lock bolt 14 by a user-accessible and manipulatable control such as a handle, knob, lever, or other device connected to the pawl 20. In other embodiments, the pawl 20 can be mechanically connected to the ignition switch 58 to be moved back into engagement with the lock bolt 14 when the ignition switch 58 is sufficiently turned. Still other manners of re-engaging the pawl 20 with the lock bolt 14 are possible and fall within the spirit and scope of the present invention. Although the pawl spring 56 preferably fumctions to bias the pawl 20 into engagement with the lock bolt 14 when moved thereto by the actuator 18 or other pawl driving device, the pawl 20 in other embodiments is moved into engagement with the lock bolt 14 primarily or only under the force of the pawl spring 56.

When the lock bolt 14 has been moved to its unlocked position as shown in FIG. 3, the engagement portion 50 of the pawl 20 is preferably aligned with the second aperture 48 of the lock bolt 14. Therefore, re-engagement of the pawl 20 with the lock bolt 14 as described above secures the lock bolt 14 (or at least the shuttle 36 thereof) in its unlocked position. The lock bolt 14 need not necessarily be biased toward the steering column by one or more springs 46 or other biasing elements as described above. Regardless of whether such a biasing force remains on the lock bolt 14 when in its unlocked position however, re-engagement of the lock bolt 14 by the pawl 20 is a valuable and preferred feature of the present invention.

In order to lock the steering column, the above-described process of disengaging the pawl 20 from the lock bolt 14, disengaging the lock bolt 14 from the steering column, and re-engaging the pawl 20 with the lock bolt 14 is essentially performed in reverse. Specifically, in some highly preferred embodiments the pawl 20 is first disengaged from the lock bolt 14 (such as by being removed from the second lock bolt aperture 48 on the lock bolt 14). This disengagement is preferably performed by user manipulation of the ignition switch 58 as described above, whereby one or more pawl disengaging signals are sent to the actuator 18 directly or by a controller. The actuator 18 preferably responds by retracting and disengaging the pawl 20 from the lock bolt 14 to free the lock bolt 14 for movement into engagement with the steering column. In some preferred embodiments, the pawl 20 is retracted under bias force from the pawl spring 56 as described above. Any of the other alternative manners of retracting the pawl 20 from the lock bolt 14 as also described above can be employed to disengage the pawl 20 from the lock bolt 14 in preparation of locking the steering column.

After the pawl 20 has been disengaged from the lock bolt 14, the lock bolt 14 is preferably moved into engagement with the steering column. This movement is preferably generated solely by the lock bolt biasing element(s) 46, but can instead be generated by rotation of the ignition switch 58 mechanically connected to the lock bolt 14 as described above. Alternatively, the lock bolt 14 can be moved into engagement with the steering column in any of the other manners described above for moving the lock bolt 14 out of engagement with the steering column. In the event that the steering column is not in proper alignment with the lock bolt 14 to be engaged therewith, the entire lock bolt 14 can remain out of its locked position (especially in cases of a one-piece lock bolt 14) and preferably biased toward engagement with the steering column, or a part of the lock bolt 14 can remain out of engagement with the steering column while the remainder of the lock bolt 14 is moved to its locked position. The highly preferred latter embodiment is illustrated in the figures, in which the shuttle 36 is moved into its locked position shown in FIGS. 2 and 3 while the shaft piece 34 remains disengaged from the steering column shaft. In either case, when the steering column is eventually brought into proper alignment with the lock bolt 14, the lock bolt 14 engages with and locks the steering column.

After the steering column is engaged by the lock bolt 14 (or at least that part of the lock bolt 14 with which the pawl 20 engages, such as the shuttle 36 in the illustrated preferred embodiment), the pawl 20 is preferably moved into engagement with the lock bolt 14. In the highly preferred embodiment shown in the figures, this is performed by user manipulation of the ignition switch 58. Specifically, one or more sensors directly or indirectly connected to the ignition switch 58 detect when the ignition switch 58 has been turned to a locked position, at which time the sensors send one or more signals to the actuator 18 directly or via a controller to actuate and to move the pawl 20 into engagement with the lock bolt 14 at the first lock bolt aperture 48. All or at least a portion of the lock bolt 14 is thereby prevented from being moved to its unlocked position as described in more detail above. In alternative embodiments, the pawl 20 can be actuated into re-engagement with the lock bolt 14 in any manner described above with reference to engagement of the lock bolt 14 in its unlocked position.

The illustrated preferred embodiment of the present invention is used in conjunction with a keyless ignition lock. However, one having ordinary skill in the art will appreciate that the present invention can be employed with a key ignition lock having a conventional tumbler with pins, in which case manipulation of the ignition lock to its various positions preferably performs the same functions as described above, either by physical connection of the ignition lock to the pawl 20 and preferably also to the lock bolt 14 or by electrical connection thereto (employing one or more sensors and actuators as described above). The present invention can even be employed without an ignition switch similar to that shown in the figures. For example, one or more user-accessible buttons or similar controls located anywhere on the vehicle and electrically connected to the lock apparatus 10 either directly or by a controller can instead be used. The present invention resides not in the ignition switch or other user-manipulatable device connected to the lock apparatus 10, but in the lock apparatus 10 itself and its constituent components.

In some highly preferred embodiments of the present invention such as the lock apparatus 10 shown in the figures, the ignition switch 58 has multiple positions that correspond to different states of the lock apparatus 10. The positions can be rotational positions of a knob like that shown in FIGS. 1–5, lift positions of a switch or lever, sliding positions of a slide, and the like. The ignition switch 58 preferably has a first or "off" position in which the lock bolt 14 is engaged with the steering column and is engaged by the pawl 20. When the ignition switch 58 is pushed axially (in the illustrated preferred embodiment) or is moved in another manner such as by being pulled, twisted or rotated to another position, a user authorization sequence is initiated as described above. If the user is determined to be an authorized user, a signal is preferably transmitted to the actuator 58 to disengage the pawl 20 from the lock bolt 14. However, the lock bolt 14 preferably remains engaged with the steering column. If the user is not determined to be authorized, the pawl 20 remains engaged with the lock bolt 14 and further manipulation (e.g., turning, pressing, lifting, etc. of the ignition switch 58) does not generate movement of the lock bolt 14 due to its engagement with the pawl 20. In alternative embodiments of the present invention employing a conventional key-operated tumbler, the ignition switch 58 preferably has another rotational position to which the ignition switch 58 can be turned with the proper key. In this position, the pawl 20 is caused to be retracted from the lock bolt 14 as just described, such as by the actuator 18, by mechanical connection between the ignition switch 58 and the pawl 20, and the like.

Upon rotation or other manipulation of the ignition switch 58 to a second or "accessory" position from the off position after the pawl 20 has been disengaged from the lock bolt 14, the lock bolt 14 is preferably disengaged from the steering column and the pawl 20 is re-engaged with the lock bolt 14 in another position on the lock bolt 14 as described in more detail above. The ignition switch 58 can also have one or more additional positions, such as a "run" position in which the vehicle is running and a "start" position in which the vehicle is started. Preferably, the steering column remains engaged by the lock bolt 14 and the pawl 20 remains engaged with the lock bolt 14 in these other positions of the ignition switch 58. It should be noted that the various positions of the ignition switch 58 just described are only preferred and represent only one possible controls embodiment for use with the present invention. Any combination of other control positions can instead be employed to move the pawl 20 into and out of engagement with the lock bolt 14 and to move the lock bolt 14 into and out of engagement with the steering column as described above, each one of which falls within the spirit and scope of the present invention.

The pawl 20 and lock bolt 14 of the present invention interact by securing the lock bolt 14 in both its locked and unlocked positions—a feature not found in conventional steering column locks. When an unauthorized user exerts manual force upon the lock bolt 14 to move it from its locked position to its unlocked position, the pawl 20 engaged with the lock bolt 14 prevents such movement, first requiring actuation of the actuator 18. In the illustrated preferred embodiment, this is not possible without electronic control of the apparatus, thereby adding a significant security measure to the vehicle. On the other hand, when the lock bolt 14 is retracted from the steering column, the lock bolt 14 is positively secured against movement toward its locked position by the pawl 20, thereby increasing the safety of the apparatus 10 even in harsh operating conditions.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, the actuator 18 described above and illustrated in the figures is preferably an electromagnetic solenoid. However, other embodiments of the present invention can employ any other type of conventional actuation device, such as a servo motor connected to the pawl 20 (e.g., connected to a pivotable pawl pivot 24 to which the pawl 20 is mounted), by a hydraulic or pneumatic cylinder, and the like.

The lock bolt 14 of the present invention as described above and illustrated in the figures releasably engages a steering column of a vehicle. One having ordinary skill in the art will appreciate that this engagement need not be direct. Specifically, the lock bolt 14 can instead or also releasably engage a part, element, or assembly connected to the steering column, such as a disc, jacket, collar, ring, plate, frame, or other structure connected to the steering column. Lock bolt engagement with an aperture in the steering column is only preferred, and the present invention is not dependent upon the type or location of locking engagement between the extended lock bolt 14 and the steering column.

Although the lock bolt movement described above is preferred, it should be noted that the lock bolt 14 can move in a number of different manners to engage with and disengage from the steering column. In a broad aspect of the present invention, the pawl 20 is movable to engage the lock bolt 14 in at least two positions on the lock bolt 14: a first position in which the lock bolt 14 is engaged with the steering column and a second position in which the lock bolt 14 is disengaged from the steering column. To this end, the lock bolt 14 can move in any number of different manners to engage with and disengage from the steering column, including without limitation rotation, translation, or any combination thereof. Any such movement permitting the pawl 20 to engage with different portions of the lock bolt 14 in locked and unlocked positions is possible. As such, the lock bolt 14 can take any number of different shapes determined at least partially by the manner in which the lock bolt 14 moves to engage and disengage the steering column and to be engaged with and disengage from the pawl 20.

By way of example only, the lock bolt 14 can be a disc rotatable about an off-center axis with an edge that is therefore movable relative to the steering column (into and out of engagement therewith) by rotation of the disc and with a face having two apertures for releasable engagement by the pawl 20. As another example, the lock bolt 14 can be a hook, pin, rod, or other element movable into and out of engagement with an apertured, faceted, toothed, or uneven face of a disc that is concentric with and connected to the steering column (i.e., in the plane of the page in FIGS. 2–5). The lock bolt 14 in such an embodiment can be pivoted, translated, or pivoted and translated with respect to the disc by a conventional actuator or in any of the manners described above with reference to movement of the lock bolt 14 in the illustrated preferred embodiment. In each case, the pawl 20 is movable into and out of engagement with the lock bolt 14 in at least two different positions on the lock bolt 14 as also described in more detail above.

It should be noted that throughout the appended claims, when one element is said to be "coupled" to another, this does not necessarily mean that one element is fastened, secured, or otherwise attached to another element. Instead, the term "coupled" means that one element is either connected directly or indirectly to another element or is in mechanical or electrical communication with another element. Examples include directly securing one element to another (e.g., via welding, bolting, gluing, frictionally engaging, mating, etc.), elements which can act upon one another (e.g., via camming, pushing, or other interaction), one element imparting motion directly or through one or more other elements to another element, and one element electrically connected to another element either directly or through a third element.

Also, the term "engaged" as used herein and in the appended claims means that one element is positioned to affect the movability of another element. An element "engaged" by another element can have its movability affected in any number of manners and directions with unaffected movability in other manners and directions, and need not necessarily even contact the other element.

We claim:

1. A steering column lock assembly for releasably locking a steering column, comprising:
   a lock bolt having a locked position in which the steering column is locked and an unlocked position in which the steering column is unlocked;
   a switch actuatable to generate first and second signals; and
   a pawl pivotable in response to the first and second signals between retracted and extended positions, the pawl extendable relative to the lock bolt to engage the lock bolt in at least two positions corresponding to the locked and unlocked positions of the lock bolt.

2. The steering column lock assembly as claimed in claim 1, wherein the lock bolt includes a tip portion and a shuttle movable with respect to one another.

3. The steering column lock assembly as claimed in claim 2, further comprising a spring coupled to the lock bolt and positioned to bias the tip portion away from the shuttle and toward the steering column.

4. The steering column lock assembly as claimed in claim 1, wherein the pawl is rotatably mounted about a pivot.

5. The steering column lock assembly as claimed in claim 4, further comprising a spring coupled to the pawl and positioned to bias the pawl toward an engaged position with the lock bolt.

6. The steering column lock assembly as claimed in claim 1, wherein the lock bolt has at least two apertures in which the pawl is removably received when engaged with the lock bolt.

7. The steering column lock assembly as claimed in claim 6, wherein the at least two apertures are substantially axially aligned along the lock bolt.

8. The steering column lock assembly as claimed in claim 1, further comprising a lock bolt spring biasing the lock bolt toward the steering column.

9. The steering column lock assembly as claimed in claim 1, further comprising an actuator coupled to the pawl and operable to move the pawl into and out of engagement with the lock bolt.

10. A steering column lock assembly for locking a steering column of a vehicle, the steering column lock assembly comprising:
    a lock bolt movable into and out of locking engagement with the steering column;
    a pawl pivotable between a retracted position and an extended position with respect to the lock bolt, the lock bolt and pawl having a first relative position in which the pawl is extendable into engagement with the lock bolt at a first location on the lock bolt, and a second relative position in which the pawl is extendable into engagement with the lock bolt at a second location on the lock bolt;
    a controller operable to generate first and second signals; and
    an actuator coupled to the controller and to the pawl, the actuator operable to receive the first and second signals to move the pawl between its retracted and extended positions.

11. The steering column lock assembly as claimed in claim 10, wherein the lock bolt includes a tip portion and a shuttle movable with respect to one another.

12. The steering column lock assembly as claimed in claim 11, wherein the tip portion is spring-biased away from the shuttle and toward the steering column.

13. The steering column lock assembly as claimed in claim 10, further comprising an aperture at the first location on the lock bolt and into which the pawl is removably received in its extended position.

14. The steering column lock assembly as claimed in claim 13, further comprising an aperture at the second location on the lock bolt and into which the pawl is removably received in its extended position.

15. The steering column lock assembly as claimed in claim 14, wherein the apertures at the first and second locations on the lock bolt are aligned along a longitudinal axis of the lock bolt.

16. The steering column lock assembly as claimed in claim 10, further comprising an aperture at the second location on the lock bolt and into which the pawl is removably received in its extended position.

17. The steering column lock assembly as claimed in claim 10, wherein the lock bolt is blocked by the pawl from moving into locking engagement with the steering column when the pawl is extended to the first location on the lock bolt.

18. The steering column lock assembly as claimed in claim 10, wherein the lock bolt is blocked by the pawl from moving out of locking engagement with the steering column when the pawl is extended to the second location on the lock bolt.

19. The steering column lock assembly as claimed in claim 10, further comprising a spring biasing the lock bolt toward locking engagement with the steering column.

20. The steering column lock assembly as claimed in claim 10, further comprising a spring biasing the pawl toward engagement with the lock bolt.

21. The steering column lock assembly as claimed in claim 20, wherein the pawl is rotatably mounted upon a pivot.

22. A steering column lock assembly for releasably locking a steering column, comprising:

a lock bolt having a locked position in which the steering column is locked and an unlocked position in which the steering column is unlocked;

a switch actuatable to pivot a pawl between retracted and extended positions;

the pawl mechanically disconnected from the switch and releasably engageable with the lock bolt in at least two positions corresponding to the locked and unlocked positions of the lock bolt.

23. A steering column lock assembly for locking a steering column of a vehicle, the steering column lock assembly comprising:

a lock bolt movable into and out of locking engagement with the steering column;

a pawl pivotable between a retracted position and an extended position with respect to the lock bolt, the lock bolt and pawl having a first relative position in which the pawl is extendable into engagement with the lock bolt at a first location on the lock bolt, and a second relative position in which the pawl is extendable into engagement with the lock bolt at a second location on the lock bolt;

a controller; and an actuator electrically connected to the controller and coupled to the pawl, the actuator operable by the controller to move the pawl between its retracted and extended positions.

* * * * *